United States Patent [19]

Bonato

[11] Patent Number: 4,601,923

[45] Date of Patent: Jul. 22, 1986

[54] MOLD FOR MANUFACTURING OBJECTS BY A CENTRIFUGAL CASTING METHOD

[75] Inventor: Emil Bonato, Königswinter, Fed. Rep. of Germany

[73] Assignee: Centricon Maschinenbau Emil Bonato & Co. KG, Koenigswinter, Fed. Rep. of Germany

[21] Appl. No.: 745,002

[22] Filed: Jun. 13, 1985

[30] Foreign Application Priority Data

Jun. 29, 1984 [DE] Fed. Rep. of Germany ....... 3423953

[51] Int. Cl.[4] ....................... B28B 21/80; B29C 41/04

[52] U.S. Cl. ........................................ 425/425; 24/25; 24/268; 24/282; 220/4 B; 220/327; 403/344; 403/374; 425/434; 425/441

[58] Field of Search ........................... 24/25, 268, 282; 220/4 B, 327; 403/344, 374; 425/589, 435, 429, 430, 441, 442, 434

[56] References Cited

U.S. PATENT DOCUMENTS

| | | | |
|---|---|---|---|
| 4,074,402 | 2/1978 | Taketani | 24/268 |
| 4,167,382 | 9/1979 | Freedman et al. | 425/435 |

FOREIGN PATENT DOCUMENTS

| | | | |
|---|---|---|---|
| 1065769 | 8/1957 | Fed. Rep. of Germany . | |
| 1907226 | 9/1970 | Fed. Rep. of Germany . | |
| 0950540 | 8/1982 | U.S.S.R. | 425/435 |

*Primary Examiner*—Willard E. Hoag
*Attorney, Agent, or Firm*—Michael J. Striker

[57] ABSTRACT

A mold made of steel and intended for manufacturing tubular objects by a centrifugal casting concrete method is formed of two semicylindrical shells having longitudinal flanges to which locking wedges are welded. The locking wedges provided on the two opposing flanges have oblique surfaces cooperating with each other. The oblique surfaces of the locking wedges extend over a plane of separation between two flanges when the mold is in a closed position.

10 Claims, 8 Drawing Figures

MOLD FOR MANUFACTURING OBJECTS BY A CENTRIFUGAL CASTING METHOD

BACKGROUND OF THE INVENTION

The present invention relates to a mold, particularly a mold of steel for manufacturing objects of concrete in accordance with a centrifugal casting method.

Casting molds of the type under consideration have been known. One of such casting molds, disclosed in German Offenlegungsschrift No. 1,907,226, is formed of two mold halves provided with opposing flanges at which the mold halves are open or closed. An outwardly projecting wedge is secured on the upper side of the longitudinal flange of the upper mold half whereas the longitudinal flange, projecting outwardly from the lower mold half over the flange of the upper mold half, is extended outwardly and angled upwardly so that it receives the upper flange along the longitudinal edge thereof, whereby a number of counter wedge abutments are formed on the upper side of the lower angled flange which overlap the wedge so that the mold halves can be clamped to each other upon a mutual displacement of the mold halves in the direction of elongation. In this known clamping device, difficulties, however, occur during the clamping of two mold halves to each other because the upwardly bent lower flange can be slightly contaminated during the filling of the mold with a filling material, and the cleaning of the mold is then extremely difficult. Furthermore, the arrangement of the wedge, as well as the abutments for this wedge, outside the plane of separation between two flanges of the mold causes a non-uniform loading of mold halves during the clamping, and the abutments on the lower flange are very difficult to adjust to provide a uniform clamping at all abutments for the wedge in the closed mold.

German Auslegeschrift No. 1,065,769 discloses a clamping device for securing two portions of a cylindrical centrifugal casting mold for producing tubes of cement to each other. Two opposing longitudinal flanges of the two mold halves are clamped to each other by a hinged clamping lever displaceable in the direction of flanges and two oblique surfaces, of which one oblique surface is provided on the clamping lever engaged with one flange and the other oblique surface is provided on the flange of the opposite mold half, whereby the clamping of two flanges to each other is obtained by a hammer blow exerted on the flanges in the longitudinal direction thereof relative to the clamping lever. The clamping lever slides with its wedge shoe carrying one oblique surface along the axis parallel to the longitudinal flanges, and a locking of the mold halves is obtained by the hammer blow exerted in the opposite direction. In this other construction of the clamping device the arrangement of two cooperating oblique surfaces outside the plane of separation between two flanges causes again a non-uniform clamping of the mold, which affects a further centrifugal casting process.

SUMMARY OF THE INVENTION

It is an object of the present invention to provide an improved two-part mold for manufacturing concrete objects by a centrifugal casting method.

It is another object of the invention to provide a simple and robust device for clamping two longitudinal flanges of two mold halves of the mold formed of steel and intended for manufacturing concrete articles by a centrifugal casting method.

Yet another object of the invention is to provide a mold in which two longitudinal flanges of the mold would be uniformly clamped to each other in a single operation step.

These and other objects of the invention are attained by a mold for manufacturing tubular objects in accordance with a centrigugal casting concrete method, comprising at least two mold shells which are openable and closeable to each other, each shell having a longitudinal flange extending along an axis of elongation of the mold, the longitudinal flanges of two shells being parallel to each other and opposing each other at two sides of the mold; clamping means on said flanges for clamping said shells to each other and including a plurality of locking wedges rigidly connected to said flanges and projecting outwardly therefrom and arranged in pairs on two opposing flanges so that the locking wedges of each pair are interengageable with each other in a comb-like fashion upon a relative displacement of said shells in the direction of said axis, the locking wedges of each pair having oblique surfaces facing each other and cooperating with each other so that the oblique surfaces of the locking wedges of each pair extend in a plane of separation between two shells when the latter are in a clamped position.

The mold may be formed of steel.

The locking wedges of each flange may be spaced from each other in the direction of the axis of elongation.

The locking wedges on each of said flanges may be arranged in groups over the length of the mold, said groups being spaced from each other by equal intervals.

The locking wedges in each pair may be formed as gib wedges having flattened tips oriented in opposite directions.

The mold may further include a plurality of compressing means provided on said two opposing flanges and acting in the direction of said axis to close and open the mold.

The compressing means may be spaced from each other over the length of the mold and each may include two parallel compressing blocks each mounted to a respective flange and extended outwardly therefrom transversely of said axis, said two compressing blocks being offset relative to each other in the direction of said axis, and a movable compressing member connected to one of said blocks and engaging the other of said blocks upon the movement of said compressing member to lock the mold in the closed position.

The compressing member may be a pressing screw or a hydraulically or pneumatically actuated plunger.

Due to the fact that the cooperating oblique surfaces of the locking wedges, positioned reskectiely on two opposing longitudinal flanges, extend over the plane of separation between two flanges when the mold shells are in the closed position a simple movement in the direction of the axis of elongation of the mold is sufficient to rigidly and uniformly clamp two opposing shells of the mold over the entire length of the mold. A particular advantage of the mold of this invention resides in that the oblique surfaces of two cooperating locking wedge extend in the plane of separation because this arrangement ensures that the elongated flanges of the mold are uniformly pressed against each other. The locking wedges can be welded to the respective flanges so that no adjustment of the oblique surfaces relative to each other would be necessary.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figures 1, 2, 3, 4, 5:
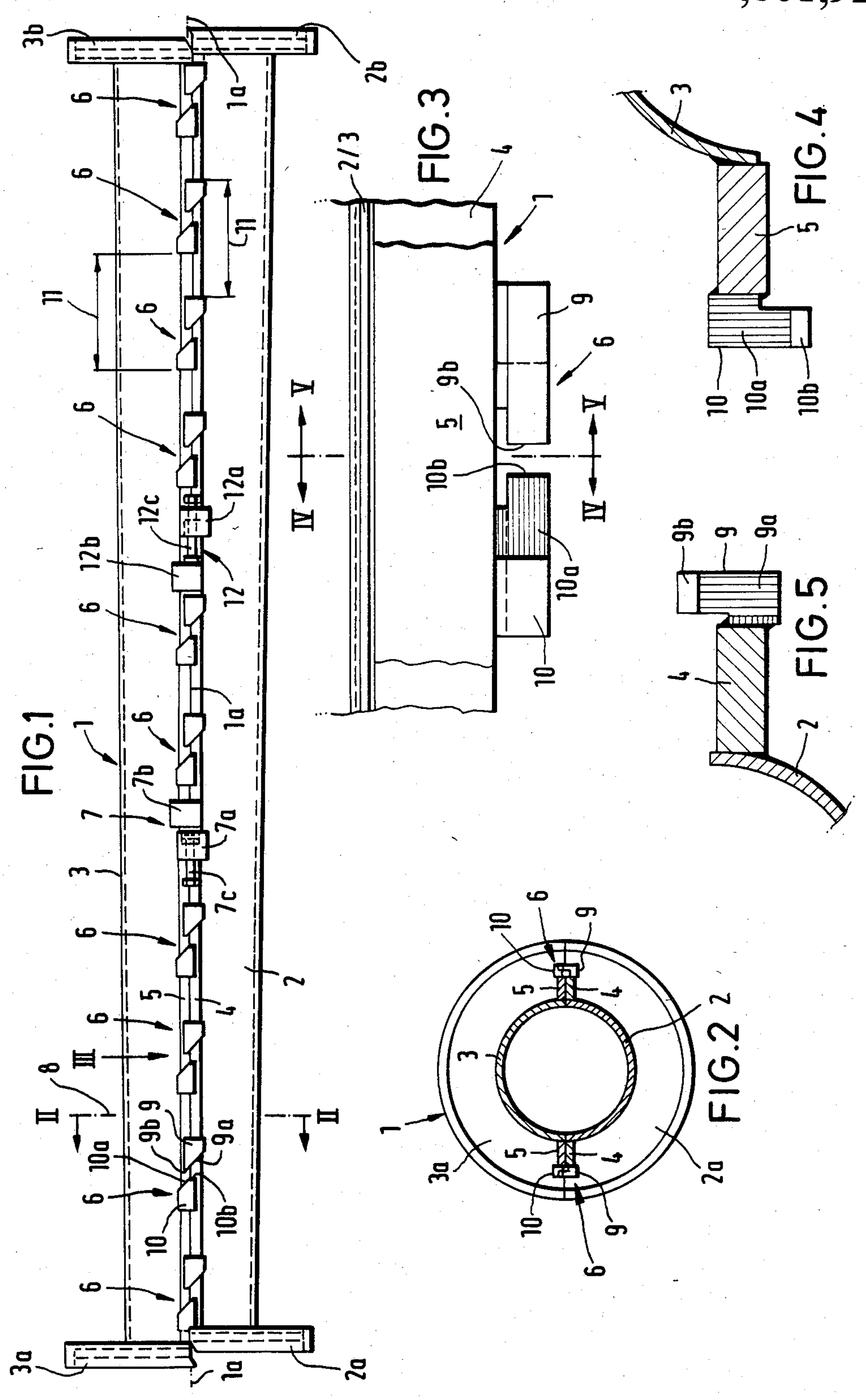
FIG. 1 is a side view of a steel mold for manufacturing tubular concrete objects in accordance with a centrifugal concrete method.
FIG. 2 is a sectional view taken along line II—II of FIG. 1.
FIG. 3 is a partial top plan view of two parallel longitudinal flanges at one side of the steel mold.
FIG. 4 is a sectional view through the upper flange, taken along line IV—IV of FIG. 3.
FIG. 5 is a sectional view through the lower flange, taken along line V—V of FIG. 3.

Referring now to the drawings in detail, and first to FIGS. 1 and 2 thereof, reference numeral 1 designates a mold which is made of steel and serves the purpose of manufacturing objects such as tubular elements or the like, according to a centrifugal concrete method. Mold 1 is comprised of at least two semicylindrical portions or halves which are shells 2 and 3 which have parallel longitudal flanges 4 and 5 at which shells 2 and 3 are clamped to each other by means of clamping devices 6. Flanges 4, 5 can extend either over the entire length of the mold shells or over the part of that length. Shells 2, 3 also have end connecting flanges 2*a*, 2*b* and 3*a*, 3*b* which, on the one hand, serve for connecting of the mold shells with further mold elements and, on the other hand, as bearing rings for suitable centrifugal mold machines.

Referring to FIGS. 1 through 6 it will be seen that longitudinal flanges 4 and 5 of mold 1 are clamped to each other by clamping devices 6 having oblique rising surfaces and movable in the direction of the axis of elongation 1*a* of the mold. On the longitudinal flanges 4 and 5, which superpose one another, there are arranged a plurality of outwardly projecting locking wedges 9, 10 which form the clamping devices 6. Locking wedges 9, 10 are arranged in pairs and engage with one another in each pair in a comb-like fashion transversely to the longitudinal flanges 4, 5 (FIG. 2). The interengaged locking wedges 9, 10 are oriented for this purpose from the inverse sides to the oppositely positioned longitudinal flange 5 or 4 of two shells and have oblique surfaces 9*a*, 10*a* which are inclined to the axis of elongation 1*a* of the mold or to the flanges 4, 5. Wedge or oblique surfaces 9*a*, 10*a* extend through a plane of separation between flanges 4 and 5 from the inverse sides so that respective locking wedges 9, 10, upon the movement of at least one shell 2 or 3 in the direction of axis 1*a* of the mold, slide one on the other and both shells 2, 3 are rigidly clamped one against the other on their longitudinal flanges 4, 5.

The pairs of locking wedges 9, 10 are arranged on the longitudinal flanges 4, 5 over the entire length of the mold at least in groups at equal intervals 11 (FIG. 1) from each other. Wedges 9, 10 are formed as gib keys with flatened wedge tips 9*b*, 10*b* facing toward each other in each pair, as clearly shown in FIG. 3.

Figure 6:
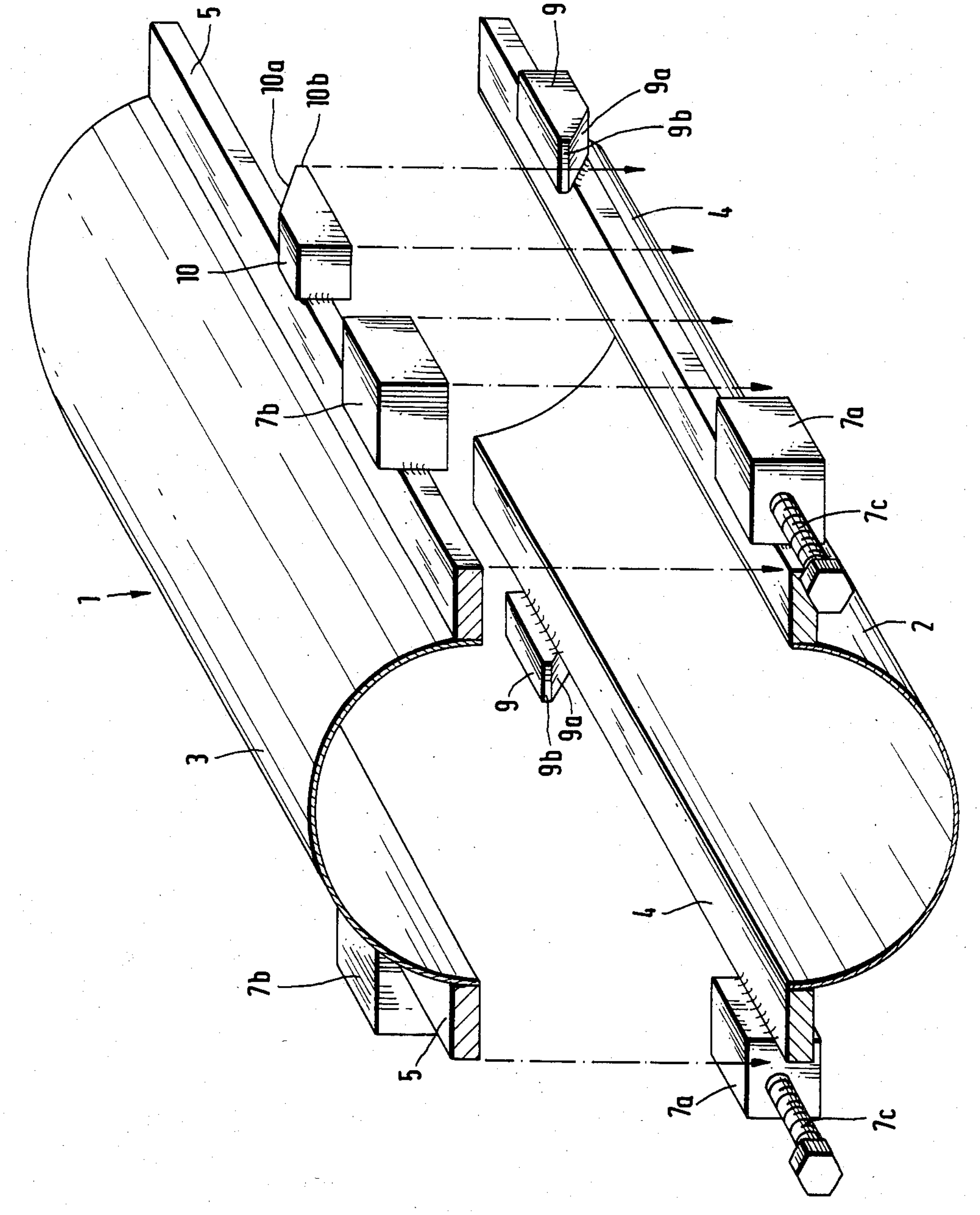
FIG. 6 is a perspective view of two mold halves with a clamping devices on two parallel longitudinal halves of the mold.
Figure 7:
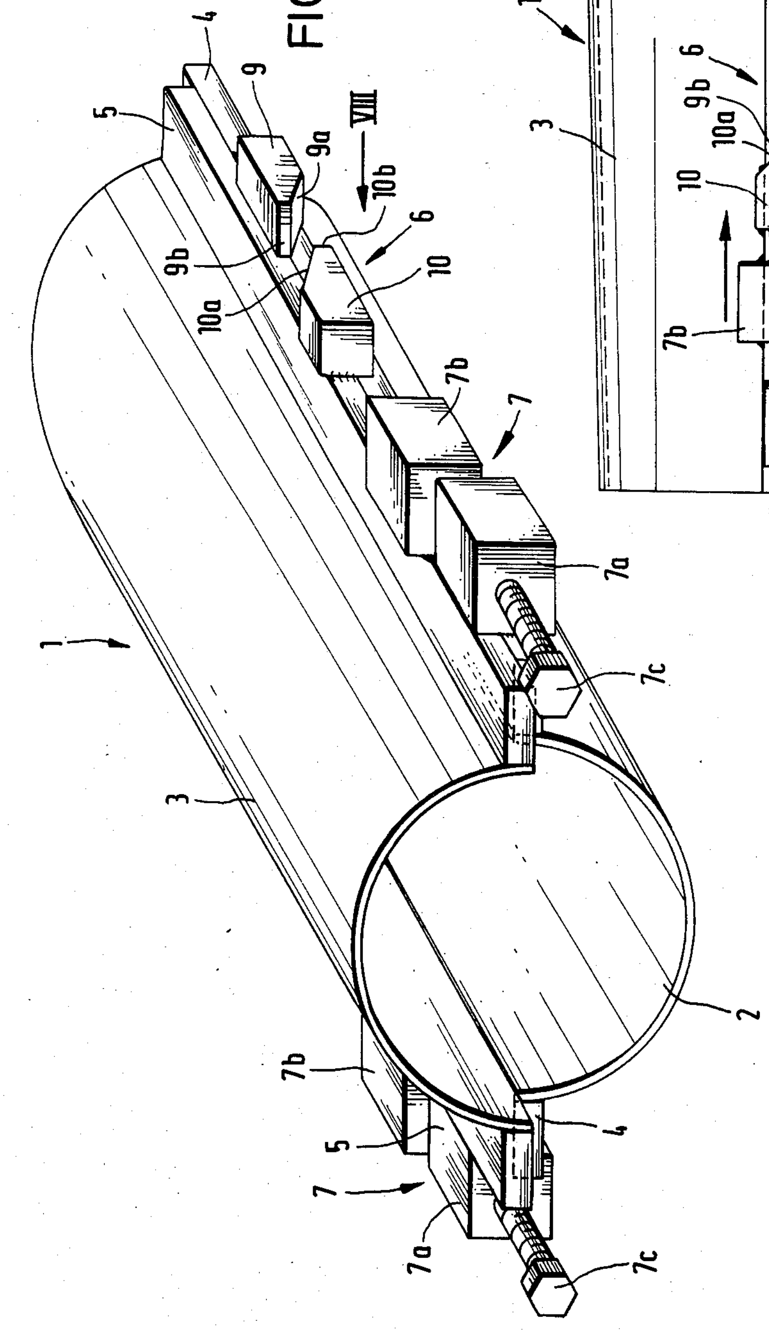
FIG. 7 is a perspective view of the mold in the closed but yet unlocked position.
Figure 8:
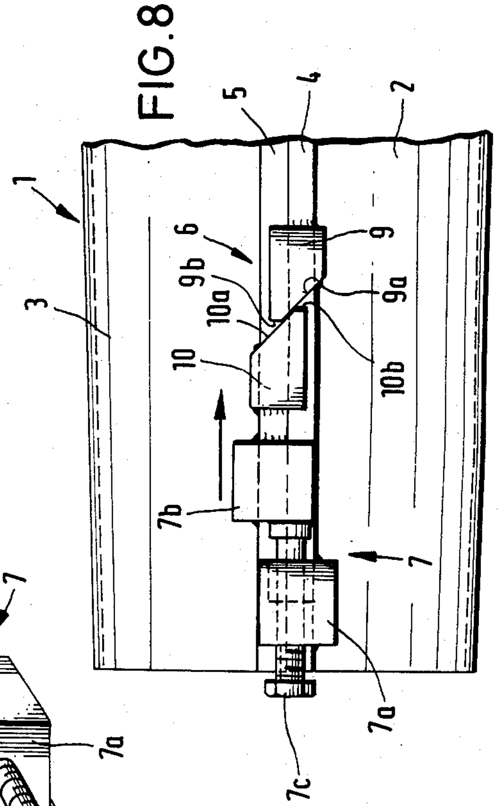
FIG. 8 is a partial side view of the mold shells in the locked position.

Compressing devices 7, 12 acting in the direction of elongation of the mold and provided with bolts 7*c*, 12*c*, respectively, are arranged on the opposite flanges 4, 5 to close and open the mold. Each compressing device is comprised of two parallel compressing blocks 7*a*, 7*b* and 12*a*, 12*b*, respectively each of which extends transversely to the axis of elongation of mold 1. As seen from FIG. 6 showing an open position of the mold and FIG. 7 illustrating the closed position of the mold, blocks 7*a* and 7*b* positioned on two opposing flanges 4 and 5 are axially offset relative to each other. Blocks 12*a* and 12*b* of the other compressing device are arranged similarly. The compressing block 7*a*, 12*a* of each compressing device carries a movable compressing piece which is the pressing bolt or screw 7*c*, 12*c*. Each pressing screw or a hydraulically or pneumatically actuated compressing plunger is moved unless compressing block 7*c*, 12*c* comes into engagement with an opposite compressing block 7*b*, 12*b* acting as a counter pressure member. FIG. 8 shows the mold in the closed and locked position.

Referring back to FIGS. 4 and 5 it will be seen that each longitudinal flange 4, 5 is rigidly connected to the respective mold shell 2, 3, for example by welding. The respective locking wedges 9, 10 of the clamping devices 6 are connected to the end faces of flanges 4, 5, respectively, also by welding.

As shown in FIG. 8 pressing or locking screws 7*c* reliably lock two opposite shells of the mold to each other while the oblique surfaces 9*a* and 10*a* of the locking wedges of each pair are in the interengaged position.

It will be understood that each of the elements described above, or two or more together, may also find a useful application in other types of molds for manufacturing objects by a centrifugal concrete method differing from the types described above.

While the invention has been illustrated and described as embodied in a mold for manufacturing objects by a centrifugal concrete method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A mold for manufacturing tubular objects in accordance with a centrifugal casting concrete method, comprising at least two mold shells which are openable and closeable to each other, each shell having a longitudinal flange extending along an axis of elongation of the mold, the longitudinal flanges of two shells being parallel to each other and opposing each other at two sides of the mold; clamping means on said flanges for clamping said shells to each other and including a plurality of locking wedges rigidly connected to said flanges and projecting outwardly therefrom and arranged in pairs on two opposing flanges so that the locking wedges of each pair are interengageable with each other in a comb-like fashion upon a relative displacement of said shells in the direction of said axis, the locking wedges of each pair having oblique surfaces facing each other and cooperating with each other so that the oblique surfaces of the locking wedges of each pair extend in a plane of separation between two shells when the latter are in a clamped position.

2. The mold as defined in claim 1, and made of steel.

3. The mold as defined in claim 1, wherein said locking wedges on each flange are spaced from each other in the direction of said axis.

4. The mold as defined in claim 3, wherein said locking wedges on said flanges are arranged in groups over the length of the mold, said groups being spaced from each other by equal intervals.

5. The mold as defined in claim 1, wherein the locking wedges in each pair are formed as gib keys having flattened tips oriented in opposite directions.

6. The mold as defined in claim 5; further including a plurality of compressing means provided on said two opposing flanges and acting in the direction of said axis to close and open the mold.

7. The mold as defined in claim 6, wherein said compressing means are spaced from each other over the length of the mold and each including two parallel compressing blocks each mounted to a respective flange and extended outwardly therefrom transversely of said axis, said two compressing blocks being offset relative to each other in the direction of said axis, and a movable compressing member connected to one of said blocks and engaging the other of said blocks upon the movement of said compressing member to lock the mold in the closed position.

8. The mold as defined in claim 7, wherein said compressing member is a pressing screw.

9. The mold as defined in claim 7, wherein said compressing member is a hydraulically actuated plunger.

10. The mold as defined in claim 7, wherein said compressing member is a pneumatically actuated plunger.

* * * * *